United States Patent Office 3,778,349
Patented Dec. 11, 1973

3,778,349
PRODUCTION OF SINGLE CELL PROTEIN
MATERIAL
Guy R. Carta, Blacksburg, Va., assignor to Research
Corporation, New York, N.Y.
No Drawing. Filed June 7, 1971, Ser. No. 150,798
Int. Cl. C12b 1/00
U.S. Cl. 195—33    3 Claims

ABSTRACT OF THE DISCLOSURE

A single cell protein material useful as an animal feed or human food supplement is prepared by culturing the microorganism Cellulomonas cartalyticum (ATCC No. 21681). A suitable substrate for culturing this microorganism for growth and production of the cell protein material is an aqueous cellulose-containing medium, such as papermill white water.

---

As population growth increases the need for protein material, as food both for humans and for animals, also increases. Already in many areas of the world there is a serious protein shortage.

One source of protein is the single cell protein material obtainable by culturing certain microorganisms. Various microorganisms have been discovered and employed to produce single cell protein material from a number of substrate materials. For example, microorganisms have been employed for the production of single cell protein material from a hydrocarbon substrate.

It is known that certain microorganisms of the Cellulomonas type are capable of producing single cell protein material when grown or cultured in a cellulose-containing substrate, see "Cellulases and Their Applications" published by American Chemical Society, Washington, D.C. (1969), particularly pp. 447–460. The disclosures of this publication are hereby made a part of this disclosure.

Cellulosic or cellulose materials are particularly useful as substrates for the culturing of microorganisms for the production of single cell protein material because of the relatively widespread availability of these materials, e.g. forest and plant materials, such as wood products, paper, paper pulp material (sulfite, sulfate or ammonia cooked pulp), including papermill white water which is a waste effluent and which gives rise to pollution control problems, bagasse and other cellulosic materials, such as corn cobs, pea pods, vegetable wastes, repulped scrap paper and the like.

It is an object of this invention to provide a process for the production of single cell protein employing a special microorganism.

It is another object of this invention to provide a process for the treatment of cellulosic-containing materials, such as papermill white water, with a special microorganism for the production of single cell protein material.

It is another object of this invention to provide a process for the removal of cellulose materials and minerals from papermill white water.

It is yet another object of this invention to provide a special single cell protein material useful as food or food supplement.

How these and other objects of this invention are achieved will become apparent in the light of the accompanying disclosure. In at least one embodiment of the practice of this invention at least one of the foregoing objects will be achieved.

In accordance with this invention it has been discovered that the microorganism Cellulomonas cartalyticum (ATCC No. 21681) when cultured in an aqueous cellulose-containing medium, produces single cell protein material useful as food, such as an animal feed supplement and the like.

The microorganism C. cartalyticum possesses the following traits: Gram-positive rod; 0.4 x 0.6–1.7 microns; forms white colonies on trypticase soy agar; forms acid but no gas from mannose, sucrose, cellobiose, maltose and glucose; slight to no acid and no gas from lactose, mannitol, glycerol and sorbitol; catalase positive; hydrolyzes starch; slow liquefaction of gelatin; non-motile; no indole production; nitrites produced from nitrates; no acetyl methyl carbinol production; does not show urease or lysine decarboxylase activity.

Lyophilized cultures of the above-identified microorganism Cellulomonas cartalyticum have been deposited at the American Type Culture Collection (ATCC), Rockville, Md., and have been assigned ATCC No. 21681.

The above-identified microorganism Cellulomonas cartalyticum can be grown or cultured in an aqueous cellulose containing medium. For example, the microorganism can be inoculated, e.g. in an amount of about 1% by volume, from tryptic soy (Difco) broth starter cultures (containing about 10 billion viable cells per ml.) into flasks provided with a preferably sterile, aqueous medium having the approximate composition about 1000 parts by weight water, 15 parts by weight of a cellulosic or cellulose-containing material, such as sulfite, sulfate or ammonia cooked paper pulp or deinked or non-inked scrap paper, about 0.05 part by weight yeast extract, about 7 parts by weight dipotassium hydrogen phosphate ($K_2HOP_4$), about 2 parts by weight monopotassium dihydrogen phosphate ($KH_2PO_4$), about 0.4 part by weight sodium citrate or sodium chloride, about 0.05 part by weight magnesium sulfate ($MgSO_4$) and about 1.0 part by weight ammonium sulfate ($(NH_4)_2SO_4$).

In accordance with one embodiment of the invention the above-identified potassium, magnesium, sodium and ammonium salts may be reduced considerably or even eliminated by employing papermill white water, preferably concentrated, as the aqueous cellulose-containing medium. The resulting inoculated medium is then incubated at a suitable temperature in the range 20–40° C., preferably in the range 25–35° C., e.g. 30° C. with agitation or shaking for an extended period of time depending upon the yield desired, e.g. about 3–5 days or more. Following incubation the resulting developed cultured-microorganism (at a concentration above about 10 billion cells/ml.) is recovered, desirably after the removal of the unconsumed cellulosic material which is usefully recycled for the growth of more microorganisms, by suitable means, such as by decantation, centrifugation and the like, e.g. by filtration through a suitable medium. The filtrate or clarified supernatant aqueous liquid is saved for the recovery therefrom of extra cellular enzymes, e.g. cellulase, and/or cellulose breakdown products and recycled at least in part for the growth of additional microorganism.

After recovery the cultured microorganism or single cell protein material is desirably resuspended in water. The resuspended single cell protein material can be packaged (bottles, cans or plastic containers) and "pasteurized" (65° C. for 30 minutes) or sterilized (15 lbs. pressure, at 121° C. for 15 minutes). Alternatively, the single cell protein material can be dehydrated, e.g. lyophilized and packaged (bottles, cans, plastic containers) with, if desired, a preservative added.

The resulting single cell protein material from the cultured microorganism, C. cartalyticum, is milky white and substantially odorless, except when heated. When heated the odor is somewhat like heated milk. The material can be employed as an animal protein supplement and when fed to animals, either in the aqueous medium as cultured or wet as recovered by filtration or after dehydration, sterilization and/or lyophilization, to increase or improve animal growth.

The amino acid content of the recovered single cell protein material would appear to be similar to that of the single cell protein material derived from other Cellulomonas species. For example, it would appear that the single cell protein material derived from *C. cartalyticum* in accordance with the practices of this invention would contain from about 15 to about 25% of its dry weight, e.g. about 20%, protein and the protein would appear to be made up of the following percents by weight amino acids:

| | |
|---|---|
| Argenine | 7–12, about 9.0. |
| Hystidine | 1.5–4, about 2.5. |
| Isoleucine | 3–7, about 5.0. |
| Leucine | 8–15, about 11.0. |
| Lysine | 5–9, about 7.0. |
| Methionine | 1–3, about 2.0. |
| Phenylalanine | 2–6, about 4.0. |
| Tyrosine | 2–7, about 3.0. |
| Threoine | 3–8, about 5.0. |
| Valine | 8–15, about 11.0. |

The single cell protein material derived from cultures of *C. cartalyticum* grown in an aqueous cellulose-salts-yeast extract medium was fed to rats and mice. Pasteurized and sterilized single cell protein material was added to the water supply of the rats for about 50 days and to the water supply of the mice for about 60 days. Enough single cell protein material was added to the water so that the concentration of the cells in the water was in the range 1–10 billion cells per ml. of water. Additionally, all the animals were fed guinea pig diet. The rats were maintained in cages designated IR, IIR and IIIR and the mice were maintained in cages designated IM, IIM and IIIM. The results of these tests, including the weight gain of the animals, are set forth in accompanying Table No. 1:

TABLE 1

| Cage | Animal color code | Initial wt. of animal in grams | Wt. of animal in grams after test period | Wt. gain in grams | Type of water supply | Appearance of animals |
|---|---|---|---|---|---|---|
| IR rats | White | 360.8 | 391.0 | 30.2 | Water contained single cell protein and was pasteurized (65° C.–30 minutes. | Normal. |
| | Blue | 365.3 | 394.5 | 29.2 | | |
| IIR rats | White | 341.0 | 370.3 | 29.3 | Water contained single cell protein, sterilized (15 p.s.i.—121° C.—15 minutes). | Do. |
| | Blue | 351.0 | 390.0 | 39.0 | | |
| IIIR rats | White | 356.6 | 376.9 | 20.3 | No supplement | Do. |
| | Blue | 354.7 | 377.0 | 22.3 | | |
| IM mice | White | 66.2 | 76.6 | 10.4 | Water contained single cell protein and was pasteurized (65° C. for 30 minutes). | Do. |
| | Blue | 70.8 | 80.1 | 9.3 | | |
| | Red | 67.9 | 77.1 | 9.2 | | |
| IIM mice | White | 69.6 | 78.3 | 8.7 | Water contained single cell protein and was sterilized (15 p.s.i. at 121° C. for 15 minutes). | Do. |
| | Blue | 59.7 | 69.4 | 9.7 | | |
| | Red | 66.3 | 77.0 | 10.7 | | |
| IIIM mice | White | 71.1 | 79.3 | 8.2 | No supplement | Do. |
| | Blue | 65.9 | 72.1 | 6.2 | | |
| | Red | 67.8 | 74.6 | 6.8 | | |
| | Green | 69.5 | 75.0 | 5.5 | | |

NOTE.—There appeared to be no difference in water consumed by the animals on protein supplement and those not on protein supplement.

The following example is illustrative of the practices of this invention for the large scale production of single cell protein material obtained by culturing the organism *C. cartalyticum*:

EXAMPLE I 1000 gallons of a sterile aqueous cellulose-mineral salts-yeast extract medium having the composition in parts by weight,

| | |
|---|---|
| $H_2O$ | 1000 |
| $K_2HPO_4$ | 7 |
| $KH_2PO_4$ | 2 |
| Na-citrate or NaCl | 0.4 |
| $MgSO_4$ | 0.05 |
| $(NH_4)_2SO_4$ | 1 |
| Yeast extract | 0.05 |
| Cellulosic material | 15 | have asceptically added thereto 10 gallons of *C. cartalyticum* starter culture containing about 10 billion viable cells per ml. A suitable starter culture or inoculum would be a trypticase-soy broth culture of *C. cartalyticum*. After startup this inoculum would be derived from the culture grown in an aqueous cellulose-mineral salts-yeast extract medium.

Preferably, the batch culturing tank would permit sterilization and aeration of the culture during growth. The inoculated batch would be maintained at a temperature of about 30° C. with aeration for about 72–100 hours. Thereafter, the batch or culture would be drained from the tank and filtered, such as through an 8–24 ply surgical gauge or a commercial filter having about the same retention and flow rate as the gauze. This filtration and separation operation serves to separate the undigested cellulose from the single cell protein material.

The recovered cellulose is usefully saved and recycled as the cellulose substrate for another batch culture. The substantially cellulose-free filtrate is then centrifuged, such as in a continuous flow centrifuge, for about 10–30 minutes at about 1000–10,000 r.p.m.

The clarified liquid from the centrifuge in accordance with one embodiment of this invention is usefully recycled as a component of the aqueous cellulose-containing growth medium for the growth of additional *C. cartalyticum*. This liquid is useful as a source of cellulases or cellulose breakdown products which may be, if desired, separated therefrom as additional product. Also, this liquid could be recycled after supplementing it with mineral salts-yeast extract together with an amount of cellulose substrate to start a new batch culture.

The single cell protein material recovered from the centrifugation operation could, if desired, be resuspended in varying amounts of water depending upon the concentration of single cell protein material desired therein. The resuspended single cell protein material could be (a) packaged and pasteurized,
(b) packaged and sterilized,
(c) freeze-dried (lyophilized) and packaged.

In the preparation of the cellulose-containing growth medium various cellulosic materials could be employed to provide the cellulose therein. Suitable cellulosic materials would include non-inked or deinked scap paper, repulped scrap paper, chemical or semi-chemical pulp, sulfite, sulfate or ammonia cooked paper pulp or concentrated papermill white water.

Suitable cellulose material could also be derived from cellulosic waste material available from various food processing operations, e.g. pea pods, corn cobs, bagasse and the like. In connection with the use of these materials an alkali pretreatment, such as cooking in 8–12 N NaOH at 50–100° C. for about 20–90 minutes would be a prerequisite.

As will be apparent to those skilled in the art in the light of the foregoing disclosures, many substitutions, alterations and modifications are possible in the practice of this invention without departing from the spirit or scope thereof.

I claim:

1. A method of producing a single cell protein material useful as an animal feed supplement which comprises culturing the microorganism *Cellulomonas cartalyticum* (ATCC No. 21681) in an aqueous medium consisting essentially of papermill white water supplemented with mineral salts and about 0.005% by weight yeast extract or recovered microorganism *Cellulomonas cartalyticum* and recovering the resulting produced or cultured microorganism.

2. A method in accordance with claim 1 wherein said aqueous medium contains a minor amount by weight of about 0.005% yeast extract or about 0.05% by weight extract of *C. cartalyticum*.

3. A method in accordance with claim 1 wherein said culturing is carried out at a temperature in the range from about 20° C. to about 40° C.

References Cited

UNITED STATES PATENTS 3,627,095    12/1971    Srinivasan et al. _____ 195—33

OTHER REFERENCES

Dunlap et al.: Chem. Abs., vol. 71, No. 92796f, "Microbial Protein From Bagasse," 1969.

Gould, R. F.: Adv. Chem. Ser., vol. 95, "Celluloses and Their Applications," pp. 447–60, 1969.

Ingraham, H. G.: Mfg. & Test Paper and Bd., vol. 3, edited by Stephenson, p. 52, 1953.

LIONEL M. SHAPIRO, Primary Examiner

R. B. PENLAND, Assistant Examiner

U.S. Cl. X.R.

99—9, 14